United States Patent [19]
Le et al.

[11] Patent Number: 5,841,999
[45] Date of Patent: Nov. 24, 1998

[54] INFORMATION HANDLING SYSTEM HAVING A REGISTER REMAP STRUCTURE USING A CONTENT ADDRESSABLE TABLE

[75] Inventors: Hung Qui Le, Austin, Tex.; Erdem Hokenek, Yorktown Heights, N.Y.

[73] Assignee: International Business Machines Corporation, Armonk, N.Y.

[21] Appl. No.: 633,327

[22] Filed: Apr. 17, 1996

[51] Int. Cl.[6] .................................................. G06F 9/30
[52] U.S. Cl. ............................................................ 395/393
[58] Field of Search ...................... 364/DIG. 1, DIG. 2; 395/393, 394, 392, 800.41, 800.42, 800.33, 800.23

[56] References Cited

U.S. PATENT DOCUMENTS

| | | | |
|---|---|---|---|
| 4,574,349 | 3/1986 | Rechtschaffen | 364/200 |
| 4,791,559 | 12/1988 | Byers | 364/200 |
| 4,901,233 | 2/1990 | Liptay | 364/200 |
| 5,134,561 | 7/1992 | Liptay | 395/425 |
| 5,185,871 | 2/1993 | Frey et al. | 395/375 |
| 5,265,227 | 11/1993 | Kohn et al. | 364/400 |
| 5,299,147 | 3/1994 | Holst | 365/49 |
| 5,355,457 | 10/1994 | Shebanow et al. | 395/375 |
| 5,390,312 | 2/1995 | Chiarot et al. | 395/400 |
| 5,625,789 | 4/1997 | Hesson et al. | 395/393 |
| 5,649,225 | 7/1997 | White et al. | 395/800.23 |

FOREIGN PATENT DOCUMENTS

| | | |
|---|---|---|
| 57-008852 | 1/1982 | Japan . |
| 57-039457 | 3/1982 | Japan . |
| 57-085148 | 5/1982 | Japan . |
| 4-245334 | 9/1992 | Japan . |
| 93-22722 | 11/1993 | WIPO . |

OTHER PUBLICATIONS

"General Purpose Register Extension," *IBM Technical Disclosure Bulletin*, vol. 24, No. 3, Aug. 1981, pp. 1404–1405.

"Vector–Register Rename Mechanism," *IBM Technical Disclosure Bulletin*, vol. 25, No. 1, Jun. 1982, pp. 86–87.

"Use of a Second Set of General Purpose Registers to Allow Changing General–Purpose Registers During Conditional Branch Resolutions," *IBM Technical Disclosure Bulletin*, vol. 29, No. 3, Aug. 1986, pp. 991–993.

"Conditional Execution in a Register Management Scheme for Out of Sequence Execution," *IBM Technical Disclosure Bulletin*, vol. 34, No. 10A, Mar. 1992, pp. 449–454.

"Collision Vector Table Logical Address, Physical Address, Flag and Valid Bit Fields Description, Function and Use," *IBM Technical Disclosure Bulletin*, vol. 36, No. 9B, Sep. 1993, pp. 381–382.

*Primary Examiner*—Robert B. Harrell
*Attorney, Agent, or Firm*—Jenkens & Gilchrist; Michele A. Mobley; Anthony V. England

[57] ABSTRACT

An information handling system includes an instruction unit, one or more execution units, a memory management unit, connected to the instruction unit, to a memory system, a cache management unit, one or more levels of cache memory associated with the one or more execution units, one or more I/O controllers connected to a bus which connects to the execution units and to the memory systems and to cache, and a completion unit for tracking sequence of instruction dispatch and instruction completion. The completion unit includes a Content Addressable Register Buffer Assignment Table, a Register Status Table, an Instruction Queue, and a Completion Table to control order of execution and completion of instructions in a sequence dependent on availability of operands.

8 Claims, 6 Drawing Sheets

INFORMATION HANDLING SYSTEM HAVING A REGISTER REMAP STRUCTURE USING A CONTENT ADDRESSABLE TABLE

TECHNICAL FIELD OF THE INVENTION

The present invention relates to information handling systems, and more particularly to information handling systems having a mechanism to permit out of sequence instruction execution.

BACKGROUND OF THE INVENTION

The design of a typical computer data processing system requires the establishment of a fixed number of addressable registers, such as general purpose registers (GPRs) and floating-point registers (FPRs), for the programmer to use in designing programs for the data processing system. Changing the number of architecturally available registers once a system is available would require substantial rewriting of programs to make use of the newly added registers.

The design of computers and computer programs is also based on the assumption that computer data processing system program instructions are executed by the data processing system in the order in which they are written in the program and loaded into the data processing system. While instructions must logically appear to the data processing system to have been executed in program order, it has been learned in an effort to improve computer performance that some instructions do not have to be physically performed in program order, provided that certain dependencies do not exist with other instructions. Further, if some instructions are executed out of order, and one of such instructions is a branch instruction, wherein a branch prediction is made to select the subsequent instruction sequence, a need to restore the registers affected by instructions in the predicted branch to their original values can occur if the branch is mispredicted. In such a case, the data processing system is restored to the condition before the branch was taken. The process of efficiently executing instructions out of order requires that values for registers prior to the predicted branch be maintained for registers affected by the instructions following the branch, while provision is made to contingently store new values for registers affected by instructions following the predicted branch. When branch instructions are resolved, the contingency of the new register values is removed, and the new values become the established values for the registers.

Large processors have for many years employed overlapping techniques under which multiple instructions in the data processing system are in various states of execution at the same time. Such techniques may be referred to as pipelining. Whenever pipelining is employed, control logic is required to detect dependencies between instructions and alter the usual overlapped operation so that results of the instructions are those that follow the one-instruction-at-a-time architectural data processor model. In a pipelined machine, separate hardware is provided for different stages of an instruction's processing. When an instruction finishes its processing at one stage, it moves to the next stage, and the following instruction may move into the stage just vacated.

In many pipelined machines, the instructions are kept in sequence with regard to any particular stage of its processing, even though different stages of processing for different instructions are occurring at the same time. If the controls detect that a result that has not yet been generated is needed by some other executing instruction, the controls must stop part of the pipeline until the result is generated and passed to the part of the pipeline where it is needed. Although this control logic can be complex, keeping instructions in sequence in the pipeline helps to keep the complexity under control.

A more complex form of overlapping occurs if the data processing system includes separate execution units. Because different instructions have different execution times in their particular type of execution unit, and because the dependencies between instructions will vary in time, it is almost inevitable that instructions will execute and produce their results in a sequence different from the program order. Keeping such a data processing system operating in a logically correct manner requires more complex control mechanisms than that required for pipeline organization.

Interrupt has the same effect as branch. When an instruction causes an interrupt, the effect of all newer instructions must be eliminated by having a mechanism to restore the machine to the state at the time the interrupt occurs.

One problem that arises in data processing systems having multiple execution units is providing precise interrupts at arbitrary points in program execution. For example, if an instruction creates an overflow condition, by the time such overflow is detected, it is entirely possible that a subsequent instruction has already executed and placed a result in a register or in main storage—a condition that should exist only after the interrupting instruction has properly executed. Thus, it is difficult to detect an interruption and preserve status of the data processing system with all prior but no subsequent instructions having been executed. In this example, the overflow interrupt will actually be recognized later than it occurred. Other similar situations are possible in the prior art.

Designers of some prior art data processing systems chose to handle interrupts by allowing all instructions that were in some state of execution at the time of the interrupt to complete their execution as much as possible, and then take an "imprecise" interrupt which reported that some instruction in the recent sequence of instructions had created an interrupt condition. This may be a reasonable way to handle interrupts for conditions such as overflow, where results will be returned to a programmer who will fix a program bug or correct the input data, and then rerun the program from the beginning. However, this is an unacceptable way to handle interrupts like page faults, where the system program will take some corrective action and then resume execution from the point of interruption.

Applicant is aware of U.S. Pat. No. 4,574,349, in which additional registers are provided to be associated with each GPR and in which register renaming occurs with the use of a pointer value. However, this patent does not solve the problem of precise recovery from interrupts or recovery from incorrectly guessed branches during out-of-order execution.

U.S. Pat. Nos. 4,901,233 and 5,134,561, which is a division of the 233 patent, teach a register management system which has more physical registers for general purpose use than are named in the architecture system. A renaming system identifies particular physical registers to perform as architected addressable or general purpose registers. An array control list (ACL) is provided to monitor the assignment and status of the physical registers. A decode register assignment list (DRAL) is provided to monitor the status of all of the architected registers and the correspondence to physical registers. A backup register assignment list (BRAL) is used to preserve old status information while out-of-sequence and conditional branch instructions are executed. The physical registers may retain multiple copies of individual addressable registers representing the contents at different stages of execution. The addressable register status may be restored if instruction execution is out of sequence or on a conditional branch causing a problem requiring restoration. The register management system may be used on a processor having multiple execution units of different types.

An article in the IBM Technical Disclosure Bulletin, entitled "General Purpose Register Extension," August 1981, pp. 1404–1405, discloses a system for switching between multiple GPR sets to avoid use of storage when switching subroutines.

Another article in the IBM Technical Disclosure Bulletin, entitled "Vector-Register Rename Mechanism," June 1982, pp. 86–87, discloses the use of a dummy register during instruction execution. When execution is complete, the register is renamed as the architected register named by the instruction for receiving results. During execution, the register is transparent and this allows for extra physical registers. However, neither of these articles deals with the problems caused by out-of-order instruction execution.

An article in the IBM Technical Disclosure Bulletin, entitled "Use of a Second Set of General Purpose Registers to Allow Changing General-Purpose Registers During Conditional Branch Resolutions," August 1986, pp. 991–993, shows a one-for-one matched secondary set of GPRs to hold the original GPR contents during conditional branch resolution so that such GPR contents may be used to restore the system status if necessary. Conditional mode tags are used with the GPRs to regulate status of the registers or to restore the original contents of the register.

An article in the IBM Technical Disclosure Bulletin, Volume 10A March 1992 at pages 449 to 454 shows a technique for exploiting parallelism in which a set of architected register names is mapped to a larger set of physical names so that many physical locations can be aliased to a single architected name. The technique allows for precise interrupts in out of sequence operations.

SUMMARY OF THE INVENTION

Accordingly, an information handling system includes an instruction unit, one or more execution units, a memory management unit, connected to the instruction unit, to a memory system, a cache management unit, one or more levels of cache memory associated with the one or more execution units, one or more I/O controllers connected to a bus which connects to the execution units and to the memory systems and to cache, and a completion unit for tracking sequence of instruction dispatch and instruction completion.

The completion unit includes a Content Addressable Register Buffer Assignment Table, a Register Status Table, an Instruction Queue, and a Completion Table.

It is an advantage of the present invention that a simple, flexible architecture permits out of sequence instruction execution with fast access to operands and with less hardware, thus resulting in a lower cost.

Other features and advantages of the present invention will become apparent in the following detailed description of the preferred embodiment of the invention taken in conjunction with the accompanying drawing.

DETAILED DESCRIPTION OF A PREFERRED EMBODIMENT OF THE INVENTION

Figures 1, 1A:
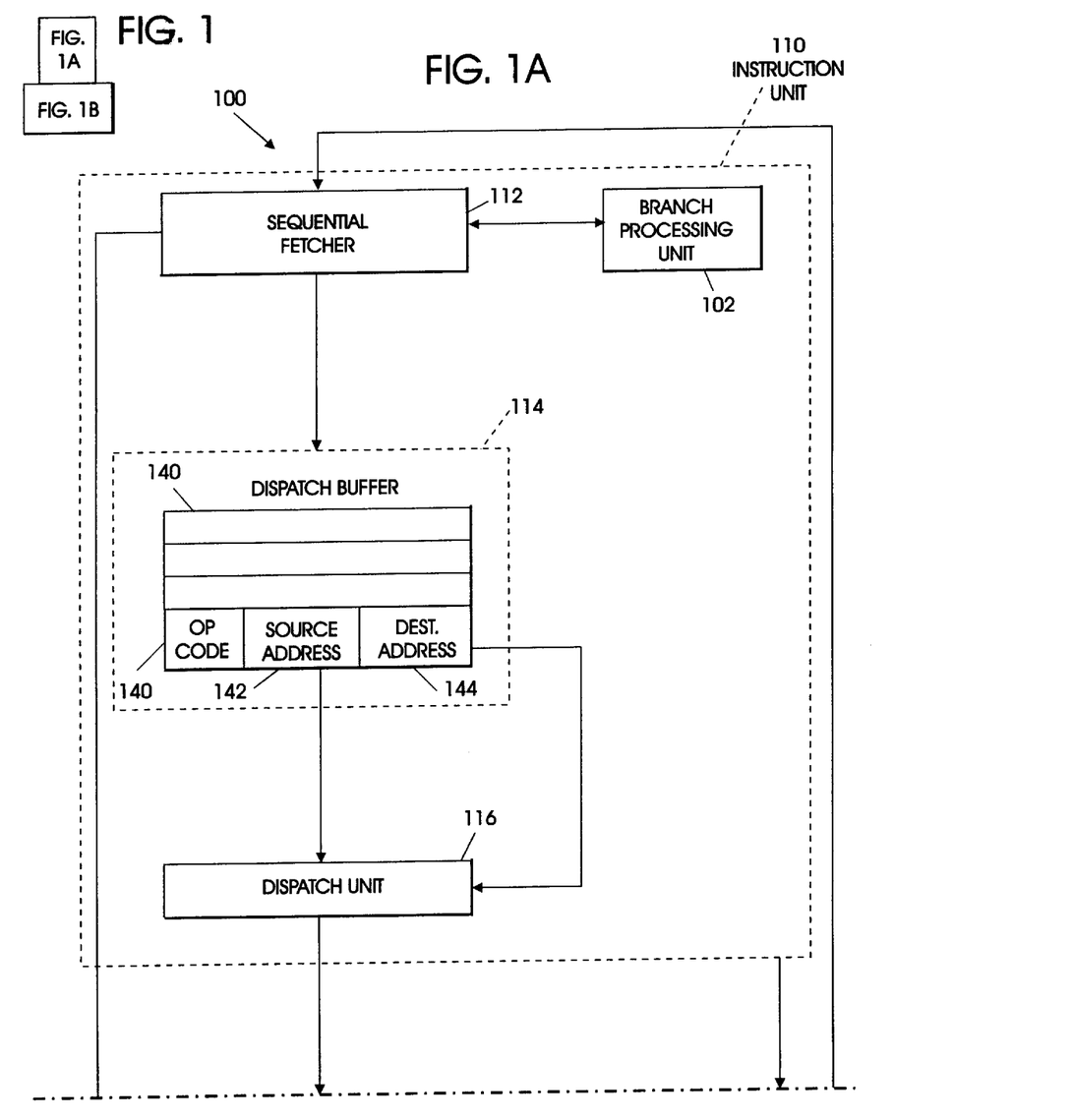
FIGS. 1, 1A, and 1B are block diagrams of an information handling system implementing the present invention.
Figure 1B:
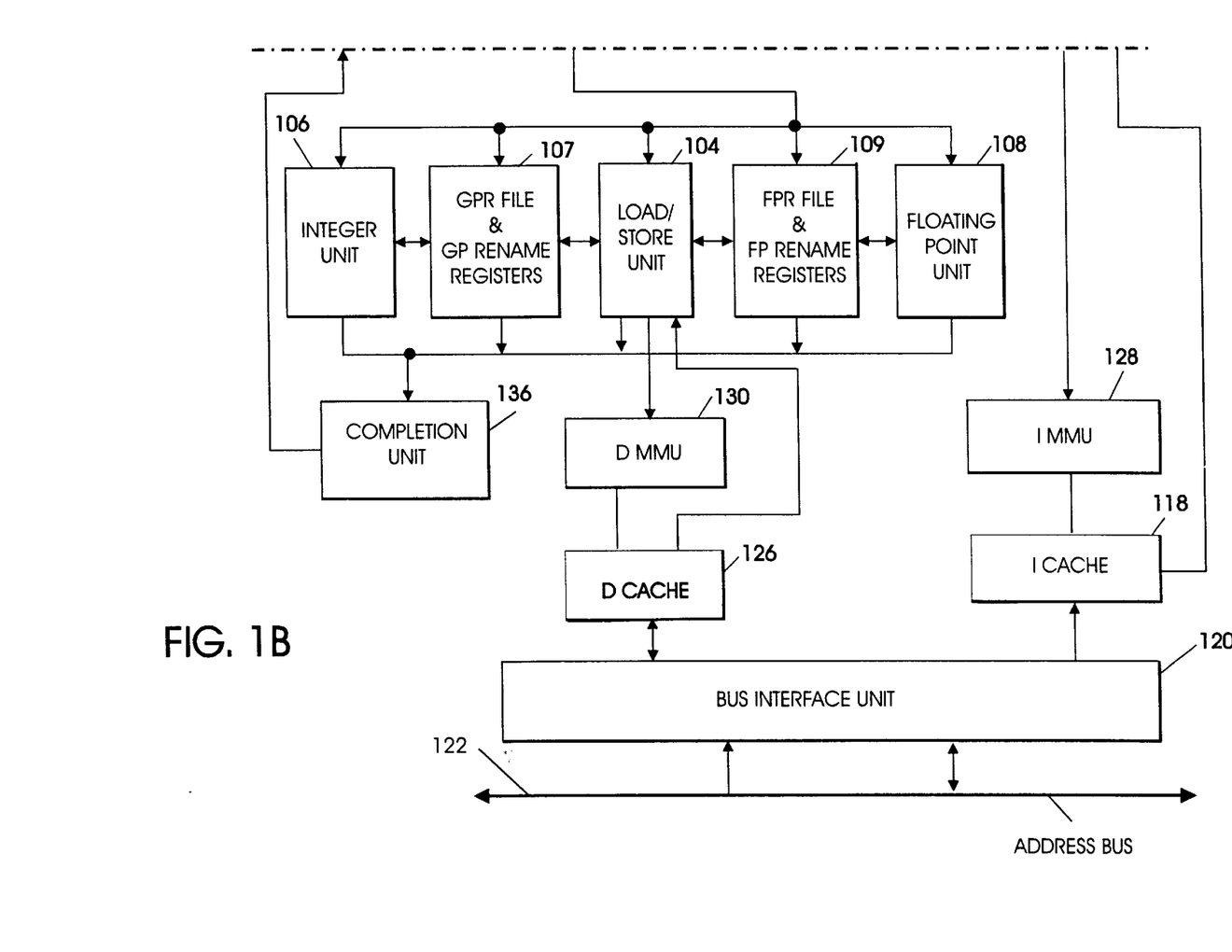

With reference now to the figures, and in particular with reference to FIG. 1, there is depicted a data processing system in accordance with the method and system of the present invention. Note that data processing system 100 is illustrated as a conceptual block diagram intended to show the basic features rather than an attempt to show how these features are physically implemented on a chip.

An instruction unit in an information handling system may issue multiple independent instructions into multiple pipelines allowing multiple instructions to execute in parallel. As illustrated in FIG. 1, data processing system 100 includes five independent execution units and two register files. The five independent execution units may include: branch processing unit (BPU) 102, load/store unit 104, integer unit 106, and flowing-point unit 108. Register files may include: general purpose register file (GPR) 107 for integer operands and floating-point register file (FPR) 109 for single-space or double-precision floating-point operands. Furthermore, both GPR 107 and FPR 109 may include a set of rename registers.

Instruction unit 110 contains sequential fetcher 112, dispatch buffer 114, dispatch unit 116, and branch processing unit 102. Instruction unit 110 determines the address of the next instruction to be fetched based upon information received from sequential fetcher 112 and branch processing unit 102.

Sequential fetcher 112 fetches instructions from instruction cache 118 and loads such instructions into dispatch buffer 114. Branch instructions are identified by sequential fetcher 112 and forwarded to branch processing unit 102 directly, bypassing dispatch buffer 114. Such a branch instruction is either executed and resolved (if the branch is unconditional or if required conditions are available), or is predicted. Non-branch instructions are issued from dispatch buffer 114, with the dispatch rate being contingent on execution unit busy status, rename and completion buffer availability, and the serializing behavior of some instructions. Instruction dispatch is done in program order. BPU 102 uses static and dynamic branch prediction on unresolved conditional branches to allow instruction unit 110 to fetch instructions from a predicted target instruction stream while a conditional branch is evaluated. Branch processing unit 102 folds out branch instructions for unconditional branches or conditional branches unaffected by instructions in progress in the execution pipeline.

Dispatch buffer 114 holds several instructions loaded by sequential fetcher 112. Sequential fetcher 112 continuously loads instructions to keep the space in dispatch buffer 114 filled. Instructions are dispatched to their respective execution units from dispatch unit 116. In operation, instructions are fetched from instruction cache 118 and placed in either dispatch buffer 114 or branch processing unit 102. Instructions entering dispatch buffer 114 are issued to the various execution units from dispatch buffer 114, and instructions are frequently dispatched more than one at a time, which may require renaming of multiple target registers according to the method and system described below. Dispatch buffer 114 is the backbone of the master pipeline for data processing system 100, and may contain, for example, an 8-entry queue. If while filling dispatch buffer 114, a request from sequential fetcher 112 misses in instruction cache 118, then arbitration for a memory access will begin.

Data cache 126 provides cache memory function for load/store unit 104. Instruction memory management unit 128 and data memory management unit 130 support accesses to virtual memory and physical memory for both instructions and data, respectively. Such memory management units perform address translations and determine whether a cache hit or miss has occurred.

Bus interface unit 120 controls access to the external address and data buses by participating in bus arbitration. The external address bus is shown at reference numeral 122, and the external data bus is shown at reference numeral 124.

Completion unit 136 retires executed instructions from a completion table (CT) in the completion unit and updates register files and control registers. An instruction is retired from the CT when it has "finished" execution and all instructions ahead of it have been "completed." The instruction's result is made visible in the appropriate architected register file at or after completion. Several instructions can complete simultaneously. Completion unit 136 also recognizes exception conditions and discards any operations being performed on subsequent instructions in program order.

Elements of the data processing system embodying the present invention which are not necessary for understanding the present invention will not be described herein, since such elements are described in U.S. patent application (AA995-038) Ser. No. 08/507,542, which is incorporated by reference herein.

Figures 2, 2B:
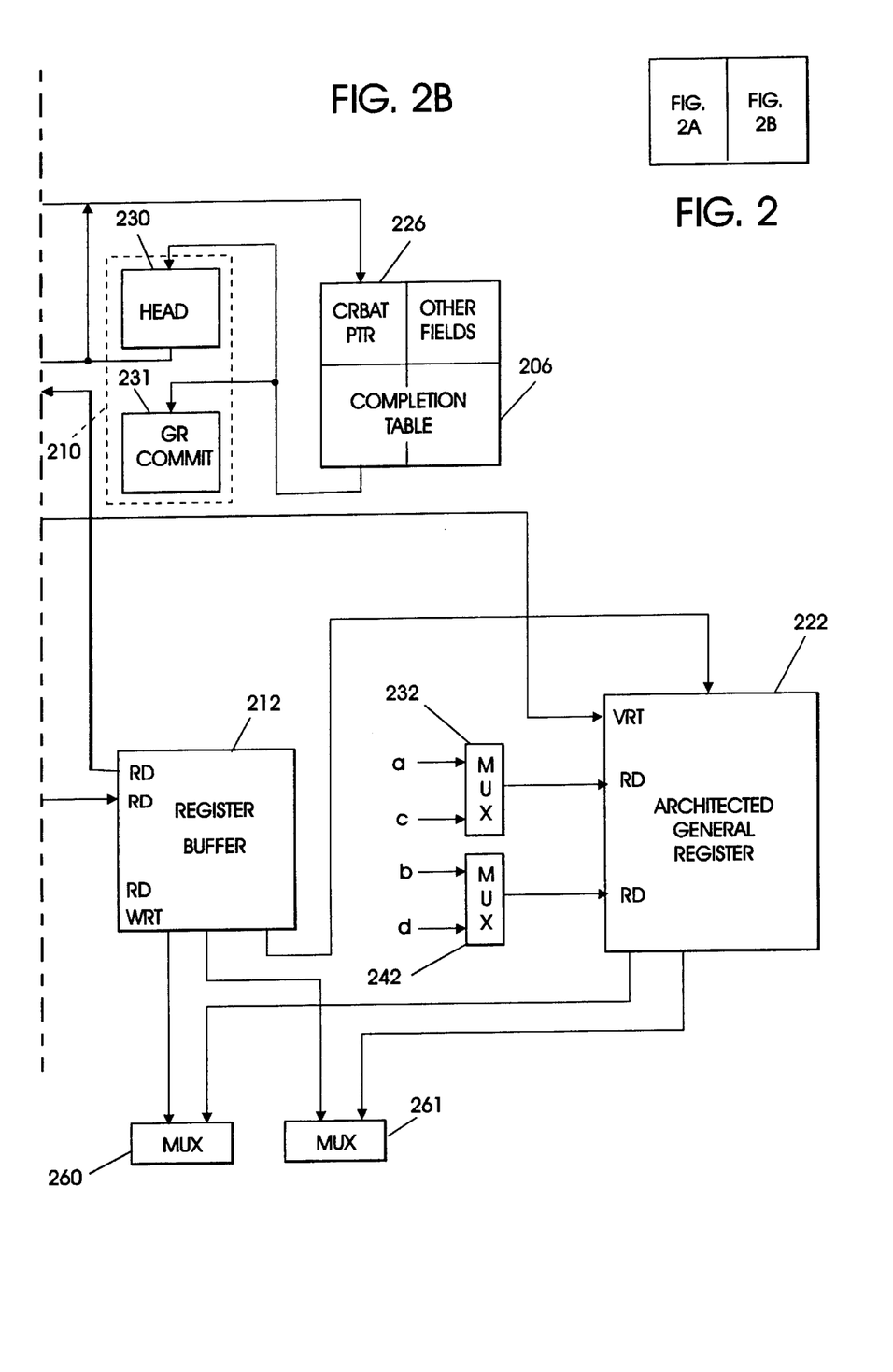
FIGS. 2, 2A, and 2B are block diagrams of a completion unit of FIG. 1, in accordance with the present invention.
Figure 2A:
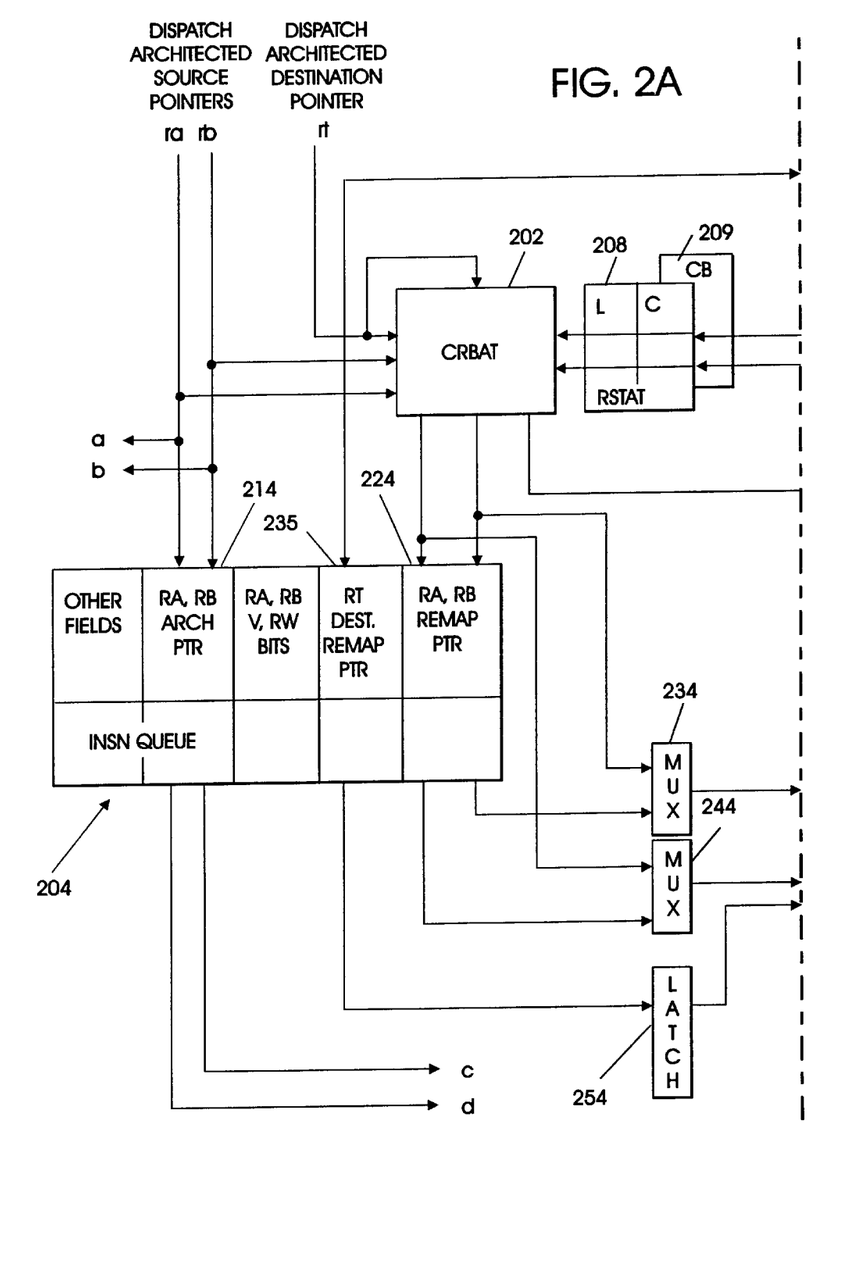

With reference now to FIG. 2, there is depicted a high-level block diagram illustrating the components of the system for managing a register array in accordance with the present invention. As illustrated, dispatch buffer 114 holds instructions awaiting dispatch to an execution unit. Such instructions may contain fields that hold op-code 140, one or more architected source register addresses in fields 142 and architected destination register address in field 144.

GPR File 107 includes the Architected General Purpose Registers 222 and the rename buffer registers in Register Buffer 212.

Coupled to dispatch buffer 114 is Content Addressable Register Buffer Assignment Table (CRBAT) 202 and Instruction Queue (IQ) 204. The CRBAT 202 has k entries, where k is the number of additional buffer registers (nonarchitected registers). In one embodiment of the invention, k is 8. According to one aspect of the present invention, CRBAT 202 is implemented with a content addressable memory (CAM). Content addressable memory is memory that allows data to be retrieved in response to a match in one or more searched fields. Such searched fields of CRBAT 202 include a field storing architected destination register address pointers. CRBAT 202 is shown in more detail in FIG. 3.

Also associated with CRBAT 202 are a pair of pointers for pointing to particular entries in CRBAT 202. Such pointers are a head pointer 230 and a GR commit pointer 231. The head pointer is a circular pointer and is utilized to select the next CRBAT entry to receive and store an architected target register address from dispatch buffer 114. The GR commit pointer, which receives field 226 from CT 206, is utilized to point to physical address pointers that will be processed when the instruction associated with the table entry is completed. The head pointer may be incremented by one or more counts and wrapped around from table entries at the bottom of the rename table to table entries at the top of the CRBAT 202.

Completion table (CT) 206 is coupled to CRBAT 202 and dispatch buffer 114. Each entry in CT 206 is allocated at dispatch and stores physical register address pointers 226 associated with the GPR that the dispatched instruction is changing. Each entry in CRBAT 202 is allocated at dispatch and stores the architected address pointer associated with the GPR that the dispatched instruction is changing. The number of entries in CRBAT 202 is the same as the number of entries in Register Buffer 212.

Instruction queue 204 includes instructions waiting to be decoded and executed (not shown), pointers to architected General registers in field 214 and pointers to buffer registers in field 224. Instruction queue 204 contains the opcode and control information to signal the execution unit how to execute the instruction. Furthermore, instruction queue 204 contains the following information:

V—Indicates the entry is valid

RA Architected GPR pointer 214—Contains the GPR architected pointer of the RA field.

RA Remap GPR pointer 224—Contains the GPR remap pointer of the RA field.

RA R—Indicates if the Remap pointer (R=1) or the Architected pointer (R=0) is used when accessing the data for RA operand.

RA W—Indicates if the RA operand is ready for use.

RB Architected GPR pointer 214—Contains the GPR architected pointer of the RB field.

RB Remap GPR pointer 224—Contains the GPR remap pointer of the RB field.

RB R—Indicates if the Remap pointer (R=1) or the architected pointer (R=0) is used when accessing the data for RB operand.

RA W—Indicates if the RA operand is ready for use.

RT Remap GPR pointer 235—Contains the GPR remap pointer of the RT field which is the destination of the result generated by this instruction.

A Register Status Table (RSTAT) 208 is a table having k entries, where each entry contains status information for a related non architected buffer register. The content of each entry is as follows:

L—indicates data available status in the related register;

C—indicates that the entry is the current remap of an architected register.

CB—indicates the C bit status before a branch instruction.

OPERATION

Instructions are dispatched from dispatch buffer 114 in sequence. Register buffer assignment managed by Register Assignment Logic 210 which contains the head pointer 230 at instruction dispatch is also in sequence. Each instruction has an associated instruction tag which specifies the location in Completion Table 206 containing information about the instruction. Instruction can be executed out of sequence, by having multiple execution units or by selecting instructions from IQ 204 based on operand availability. As instructions are executed and finished, a status is put in Completion Table 206. As instructions are completed, entries in Completion Table 206 are removed in dispatch sequence. At system reset (i.e., power on), set all C bit in RSTAT 208 to 0 indicating that the content of CRBAT 202 and register buffer 212 are not valid. Set the head circular pointer 230 to 0.

INSTRUCTION DISPATCH

Source architected pointers from dispatch buffer 114 are associatively compared against all entries in CRBAT 202 to determine which registers in Register buffer 212 are to be used. A CRBAT 202 hit (the source GPR field of the dispatched instruction matches an entry in CRBAT 202 with an active C bit in CRSTAT 208) produces the location of the hit which is used as the remap pointer of the source GPR. A hit also produces a bit from the L bits which indicates that the source operand is available in register buffer 212. A miss from CRBAT 202 indicates that the data for the source operand is available in architected general register 222. Destination architected pointers are associatively compared against all entries in CRBAT 202 and corresponding C bits in RSTAT 208 entries are set to off. New buffer pointers, which start at the value of head pointer 230 and incremented by 1 for each destination GPR, are assigned to the destination architected pointers, written into CRBAT 202, and corresponding C bits in RSTAT 208 are set on to indicate a current buffer register assignment. The new buffer pointers are also written into field 226 of CT206. Subsequent instructions which need the architected register will use the assigned buffer register from Register Buffer 212.

If the instruction is not allowed to proceed immediately, all source remap pointers are written to remap pointer field 224 of IQ 204. Destination Remap Pointers are written in field 234 of IQ 204. The source architected pointers are also stored in IQ 204 in field 214. If the GPR pointer for the source operand matches an entry in CRBAT 202, then the corresponding R bit in IQ 204 is set indicating that the remap pointer is used for that source operand. An entry is allocated to CT 206 corresponding to the dispatched instruction. The pointer that points to this entry is tagged to the instruction as the tag of that instruction.

OPERAND ACCESS

Instructions being dispatched from dispatch buffer 114 or output from IQ 204 access register buffer 212 using remap buffer pointers from field 224. Operands are simultaneously read from the architected general register array 222, and at the end of a cycle, a decision is made whether to use data from register buffer 212 or the general register array 222. For instruction that bypasses the IQ 204, a hit on CRBAT 202 indicates that the source operand data will be from register buffer 212, and the remap pointer must be used to access the data. The corresponding L bit in CRSTAT 208 indicates whether the data is available. A miss on CRBAT 202 indicates that the data is in architected general register 222. For instruction coming from IQ 204, the R bit indicates from where data should be read (R=1: from Buffer 212, R=0: from Architected General Register 222).

The instruction queue output remap pointers are connected to gates 234, 244, and 254 controlling read and write inputs to register buffer 212. The instruction queue architected pointers provide output to gates 232, 242, to read the architected general registers 222.

EXECUTION

If the data is not available or the execution units are busy, then the dispatched instruction, the remap pointers, architected pointers are saved in instruction queue 204. The R bit is set appropriately to indicate if the remap pointer is used. The W bit is set to indicate if the operand is available.

While the instruction is in instruction queue 204, its operand remap pointer (if used) is compared against the destination remap pointer of instruction executing. When there is a match, the W bit is set to indicate that operand for that instruction is available. The instruction with available operands is selected, its operands are read from register buffer 212 or architected register file 222. The instruction is then sent to the execution unit.

Any instruction is allowed to execute in any order as soon as operands become available. The L bit in RSTAT 208 is set to on after each instruction generates a result to be written into an assigned buffer register in register buffer 212.

COMPLETION

Instruction is completed in sequence. The oldest entry in CT 206 is allowed to complete if it has finished executing. The CRBAT pointer field 226 of the completing instruction in CT 206 is read out and used to access the CRBAT using the GR commit register 231. The content of CRBAT at the location pointed to by field 226 is architected general register 222 location that is to be updated. Field 226 also points to the location in register buffer 212 that contains the data to be read out and moved to architected general register 222. Data from register buffer 212 are read and written to architected general register 222. Corresponding C bits in RSTAT 208 are set to off.

Source operands in IQ 204 waiting for data from the completing instruction are marked to use the operand data in general register array 222 by setting corresponding R bit in the instruction queue to off.

BRANCH RESOLUTION

When a branch instruction is dispatched from dispatch buffer 114, the C bits in RSTAT 208 are stored in a backup C bit register 209. The head circular pointer is saved in field 226 of CT 206 at the location allocated for the branch instruction. The number of backup registers CB 209 is the same as the number of outstanding branches allowed in the system. If a branch is resolved as correct, the backup register is invalidated.

If the branch is resolved as wrong, the backup C bits are moved to the current entry in RSTAT 208, thus restoring the status of assignment at the time immediately before the incorrectly predicted wrong branch was dispatched. Field 226 at location of the branch instruction in CT 206 is read out and restored to the head circular pointer 230.

INTERRUPT

When an instruction that has an exception completes, RSTAT 208 is cleared, head pointer 230 is reset to 0. No change is required with respect to the contents of CRBAT 202.

Figure 3:
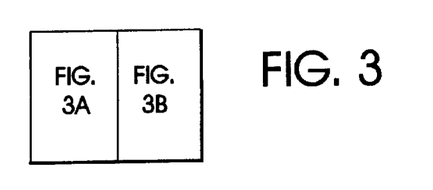
FIGS. 3, 3A, and 3B, are more detailed block diagrams of a Content Addressable Register Buffer Assignment Table, output gating and a Register Buffer in accordance with the present invention.
Figure 3A:
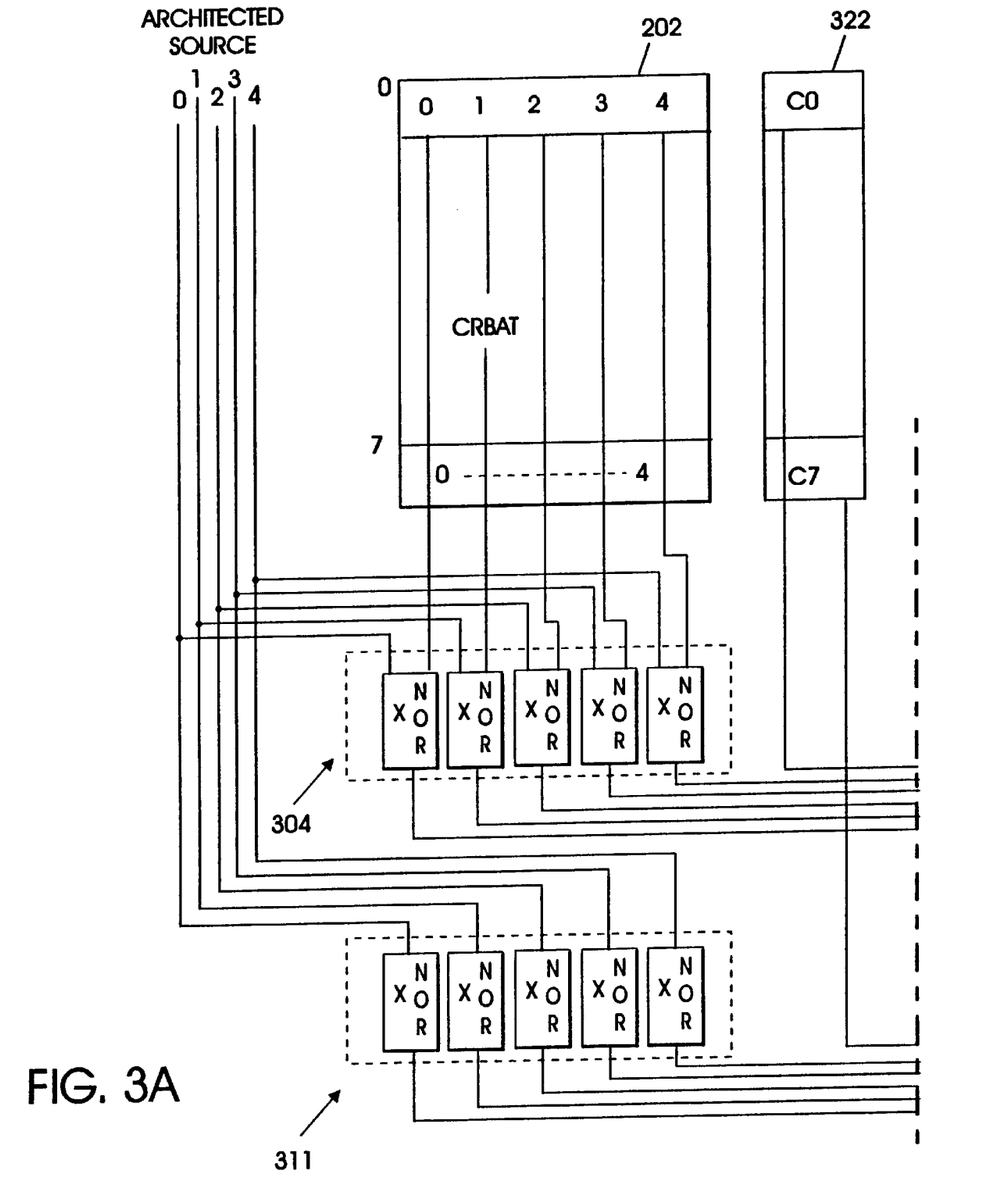
Figure 3B:
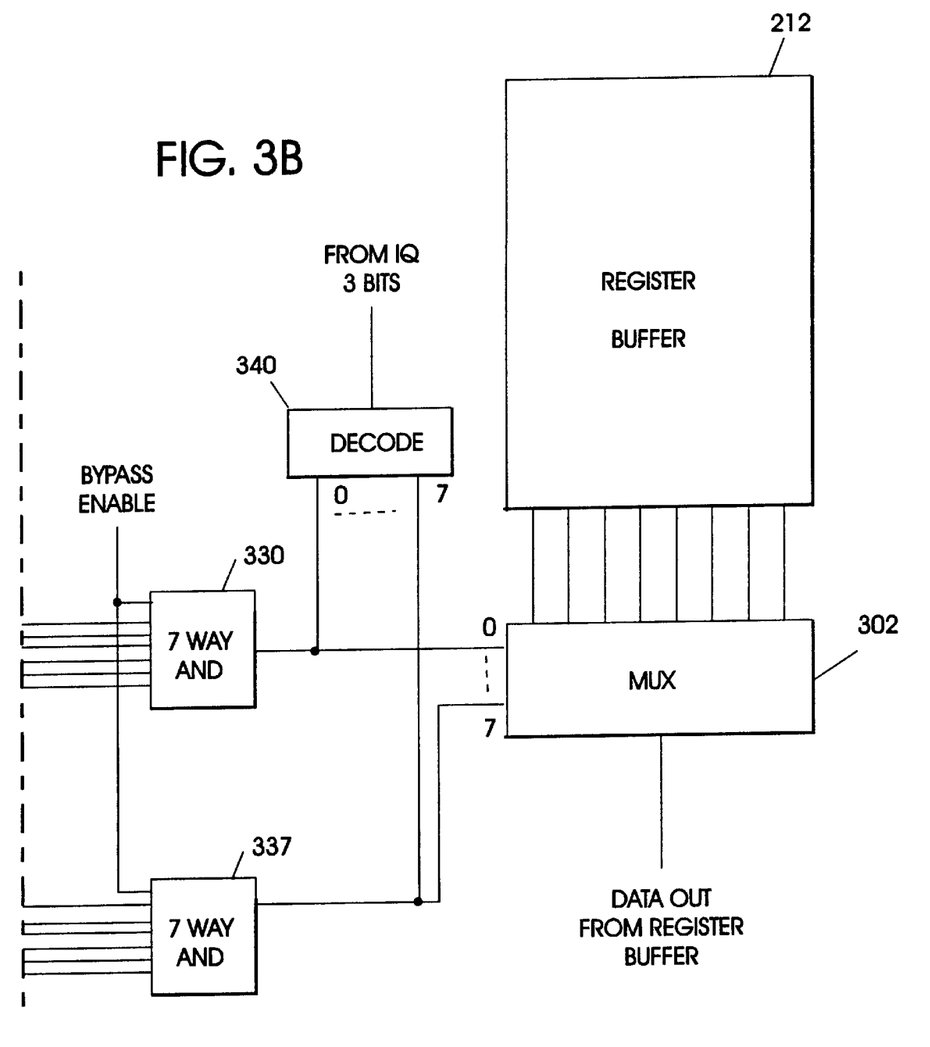

Referring now to FIG. 3, an implementation of the CRBAT 202 will be described.

As described above, in a preferred implementation, CRBAT 202 has eight entries, each entry having a number of bits representing the number of general purpose registers in architected general purpose register file 222 and a C bit. The implementation shown in FIG. 3 is for 32 general registers and eight rename or buffer registers. CRBAT 202 may be implemented with a content addressable memory. For simplicity, only one read port is shown in FIG. 3.

The output of CRBAT 202 controls the gating of data from register buffer 212 through multiplexors 302. Data from MUX 302 feeds MUX 260 for RA operands and MUX 261 for RB operands. The outputs of CRBAT 202 are exclusive NORed in exclusive NOR circuits 304–311, inclusive, with address pointer from the architected source. The outputs of the exclusive NOR circuits 304–311, inclusive, are ANDed with the C bits from the C bit portion 322 of CRBAT 202 through AND gates 330–337, inclusive.

A control line to indicate if the instruction can bypass IQ 204 is also ANDed to AND gates 330–337, inclusive. If bypass is enabled, the control of MUX 302 comes from AND gates 330–337, inclusive. If bypass is not enabled, the control of MUX 302 comes from IQ 204 field 224 through decoder 340.

In a content addressable memory implementation, the use of the C bit to gate the outputs of CRBAT 202 to multiplexor 302 insures that there is no more than one hit in CRBAT 202.

Since the CRBAT 202 has only one entry for each rename buffer, when the number of rename buffers is less than the architected number of general purpose registers, the access path for the buffer is shorter than the access path for the general purpose register array. Further, the CRBAT does not need to back up its contents when a branch instruction is dispatched. Only the C bits in RSTAT 208 need to be stored. Since the branch logic becomes much simpler, more outstanding branch paths are permitted.

Also, since branch backup remap tables are not required, there is less hardware and thus lower cost.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:
   an instruction unit;
   one or more execution units;
   a memory management unit, connected to the instruction unit, and to a memory system;
   one or more levels of cache memory associated with the one or more execution units;
   a system bus connected to the execution units and to the memory system and to the cache memory;
   one or more I/O controllers connected to the system bus for controlling I/O devices; and
   a completion unit for tracking sequence of instruction dispatch and instruction completion, wherein speculatively assigned registers are released as soon as a branch instruction is found to be mispredicted.

2. An information handling system, according to claim 1, wherein the completion unit comprises:
   a content addressable register buffer assignment table;
   a register status table;
   an instruction queue; and
   a completion table to control order of execution and completion of instructions in a sequence dependent on availability of operands.

3. An information handling system according to claim 2, further comprising one or more register units, for temporary storage of information related to instruction execution.

4. An information handling system according to claim 3, wherein the one or more register units further comprise:
   a first set of predefined registers; and
   a first set of buffer registers.

5. An information handling system according to claim 3, wherein the one or more register units further comprise:
   a second set of predefined registers; and
   a second set of buffer registers.

6. An information handling system according to claim 4, wherein the first set of predefined registers further comprises:
   a first number of architected general purpose registers; and
   the first set of buffer registers comprises a second number of registers assignable to supplement the architected general purpose registers.

7. A method for controlling completion of instructions executed in a random sequence, comprising the steps of:
   storing a tag, associated with an instruction, in a completion table, indicating a position of the instruction in a sequence of completion of the instruction relative to other instructions;
   associatively comparing source address pointers with entries in a content addressable buffer assignment table to identify a register to be used in execution of an instruction;
   associatively comparing destination address pointers with entries in the content addressable buffer assignment table to reset indicators of register assignment;
   assigning a buffer address pointer to the destination address pointer;
   storing the assigned buffer address pointer in the content addressable buffer assignment table;
   storing each destination address pointer and each assigned buffer address pointer in an instruction queue;
   accessing an first operand for execution of an instruction by using the assigned buffer address pointer to address a buffer containing the first operand;
   executing an instruction when all operands required for execution of the instruction are available;
   reading the destination address pointer and the assigned buffer address pointer from the content addressable buffer assignment table;
   gating completed instruction data from the assigned buffer to a general purpose register associated with the destination address;
   gating results of completed instructions from the general purpose registers in a predetermined sequence determined by the tags stored in the completion table.

8. A method according to claim 7, further comprising the steps of:
   simultaneously accessing an alternate operand for execution of an instruction by using the destination address pointer to address a general register containing the alternate operand; and
   selecting at a predetermined time in an instruction execution cycle one of the set of operands including the first operand and the alternate operand.

* * * * *